(12) United States Patent
Kruts et al.

(10) Patent No.: US 12,077,305 B2
(45) Date of Patent: Sep. 3, 2024

(54) RELEASABLE RESTRAINT FOR EVACUATION ASSEMBLIES

(71) Applicant: GOODRICH CORPORATION, Charlotte, NC (US)

(72) Inventors: Ivan Kruts, Sacramento, CA (US); Steven Evans, Sun City, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 696 days.

(21) Appl. No.: 16/711,638

(22) Filed: Dec. 12, 2019

(65) Prior Publication Data
US 2021/0179281 A1 Jun. 17, 2021

(51) Int. Cl.
*F16B 2/16* (2006.01)
*B64D 25/14* (2006.01)
*F16B 21/16* (2006.01)

(52) U.S. Cl.
CPC ............ *B64D 25/14* (2013.01); *F16B 2/16* (2013.01); *F16B 21/165* (2013.01); *Y10T 24/45461* (2015.01); *Y10T 403/592* (2015.01)

(58) Field of Classification Search
CPC .......... B64D 25/14; F16B 2/16; F16B 21/165; Y10T 403/591; Y10T 403/592; Y10T 24/45461; A62B 1/20
USPC ............................ 403/DIG. 3, DIG. 4, DIG. 6
See application file for complete search history.

(56) References Cited

U.S. PATENT DOCUMENTS

| | | | | |
|---|---|---|---|---|
| 1,324,654 A * | 12/1919 | Ferguson | ............... | F16L 37/23 285/277 |
| 2,279,146 A * | 4/1942 | Schneller | ............... | F16L 37/40 251/149.6 |
| 2,536,702 A * | 1/1951 | Scheiwer | ............... | F16L 37/23 285/379 |
| 2,860,893 A * | 11/1958 | Clark | ............... | F16L 37/23 285/98 |
| 3,125,790 A * | 3/1964 | Gaylord | ............... | F16G 11/10 43/43.12 |
| 4,526,262 A | 7/1985 | Malcolm | | |
| 4,567,977 A | 2/1986 | Fisher | | |
| 4,682,795 A * | 7/1987 | Rabushka | ............... | F16L 37/32 285/83 |
| 5,066,049 A * | 11/1991 | Staples | ............... | F16L 35/00 285/91 |
| 6,390,722 B1 * | 5/2002 | Godfrey | ............... | F16B 21/165 403/321 |
| 6,557,329 B2 | 5/2003 | Schmidt | | |

(Continued)

FOREIGN PATENT DOCUMENTS

| | | | | |
|---|---|---|---|---|
| CN | 104405735 A * | 3/2015 | ............ | F16B 1/02 |
| EP | 0096594 A2 * | 12/1983 | ............ | B64D 25/14 |
| EP | 0163925 A1 * | 12/1985 | ............ | B64D 25/14 |

*Primary Examiner* — Josh Skroupa
*Assistant Examiner* — Zachary A Hall
(74) *Attorney, Agent, or Firm* — SNELL & WILMER L.L.P.

(57) ABSTRACT

A releasable restraint may comprise a base and a socket coupled to the base. The socket may include a head and a shaft extending from the head, wherein the shaft defines a base channel configured to receive the base. A sleeve may be configured to translate relative to the shaft of the socket. A plurality of balls may be located in a plurality of frustoconical ball openings formed through the shaft of the socket. A plug may be received by a plug channel defined by the socket.

8 Claims, 8 Drawing Sheets

(56) References Cited

U.S. PATENT DOCUMENTS

| | | |
|---|---|---|
| 6,847,009 B2 | 1/2005 | Stuart et al. |
| 9,284,181 B1 * | 3/2016 | Nieslanik ............. A01K 27/005 |
| 10,556,698 B2 * | 2/2020 | Volny ...................... B63B 27/14 |
| 2018/0273188 A1 * | 9/2018 | Volny ...................... B63B 27/14 |
| 2018/0273192 A1 | 9/2018 | Haynes et al. |

\* cited by examiner

RELEASABLE RESTRAINT FOR EVACUATION ASSEMBLIES

FIELD

The present disclosure relates to releasable restraints, and more specifically to releasable restraint devices for evacuation assemblies.

BACKGROUND

Evacuation assemblies may include an inflatable slide that helps passengers disembark from an aircraft in the event of an emergency or other evacuation event. The slides may deploy from a door sill or a side of the aircraft fuselage. Deployment and/or unfolding of the slide is controlled by restraints placed throughout the length of the slide. The restraints typically include a shear pin, which shears (or breaks) in response to internal slide pressure. In this regard, the shear pin and/or the restraints are generally single use.

SUMMARY

A releasable restraint is disclosed herein. In accordance with various embodiments, the releasable restraint may comprise a base and a socket coupled to the base. The socket may include a head and a shaft extending from the head, wherein the shaft defines a base channel configured to receive the base. A sleeve may be configured to translate relative to the shaft of the socket. A plurality of balls may be located in a plurality of frustoconical ball openings formed through the shaft of the socket. A plug may be configured to be received by a plug channel defined by the socket.

In various embodiments, the plug may define a ball groove. In various embodiments, the sleeve may include an interference surface radially outward of the shaft and the plurality of balls. In various embodiments, the interference surface may be non-parallel to a center axis of the sleeve.

In various embodiments, the interference surface may contact the plurality of balls. In various embodiments, a spring may be configured to bias the sleeve toward the head of the socket. In various embodiments, the spring may be located in a spring cavity defined by the base, the socket, and the sleeve.

An evacuation slide is also disclosed herein. In accordance with various embodiments the evacuation slide may comprise a first strap coupled to a first portion of the evacuation slide, a second strap coupled to a second portion of the evacuation slide, and a first releasable restraint coupled between the first strap and the second strap. The first releasable restraint may comprise a first base coupled to the second strap and a first socket coupled to the first base. The first socket may include a first head and a first shaft extending from the first head, wherein the first base is located in a base channel defined by the first shaft. The first releasable restraint may further comprise a first sleeve configured to translate relative to the first shaft, a plurality of first balls located in the first shaft, and a first plug coupled to the first strap and configured to be received by a first plug channel defined by the first socket, and a first spring located around the first shaft and configured to bias the first sleeve toward the first head of the first socket.

In various embodiments, the first releasable restraint may further comprise a first spring configured to bias the first sleeve toward the first head of the first socket. In various embodiments, the first sleeve may include a first interference surface radially outward of the plurality of first balls. The first interference surface may be oriented at a first angle relative to a first center axis of the first sleeve.

In various embodiments, a third strap may be coupled to a third portion of the evacuation slide. A fourth strap may be coupled to a fourth portion of the evacuation slide. A second releasable restraint may be coupled between the third strap and the fourth strap. The second releasable restraint may comprise a second base coupled to the fourth strap and a second socket coupled to the second base. The second socket may include a second head and a second shaft extending from the second head. The second releasable restraint may further comprise a second sleeve configured to translate relative to the second shaft, a plurality of second balls located in the second shaft, and a second plug coupled to the third strap and configured to be received by a second plug channel defined by the second socket.

In various embodiments, the first strap may be coupled closer to a head end of the evacuation slide as compared to the third strap. In various embodiments, the second sleeve may include a second interference surface radially outward of the plurality of second balls. The second interference surface may be oriented at a second angle relative to a second center axis of the second sleeve. The second angle may be different from the first angle.

In various embodiments, the second releasable restraint may further comprise a second spring configured to bias the second sleeve toward the second head of the second socket. A first spring constant of the first spring may be different from a second spring constant of the second spring.

In various embodiments, a radially outward surface of the first plug may define a first ball groove. In various embodiments, a diameter of the first plug, as measured at the radially outward surface, may decrease proximate an axial end of the first plug.

A deployment assembly is also disclosed herein. In accordance with various embodiments, the deployment assembly may comprise a releasable restraint including a base and a socket coupled to the base. The socket may include a head and a shaft extending from the head. A sleeve may be configured to translate relative to the shaft. A plurality of balls may be located in a plurality of frustoconical ball openings formed through the shaft. A spring may be configured to bias the sleeve toward the head of the socket. A plug may be configured to be received by a plug channel defined by the socket.

In various embodiments, a first shackle may be coupled to the base. A second shackle may be coupled to the plug. In various embodiments, the sleeve may include an interference surface radially outward of the plurality of balls. The interference surface may be non-parallel to a center axis of the sleeve. In various embodiments, the plug may define a ball groove configured to receive the plurality of balls.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
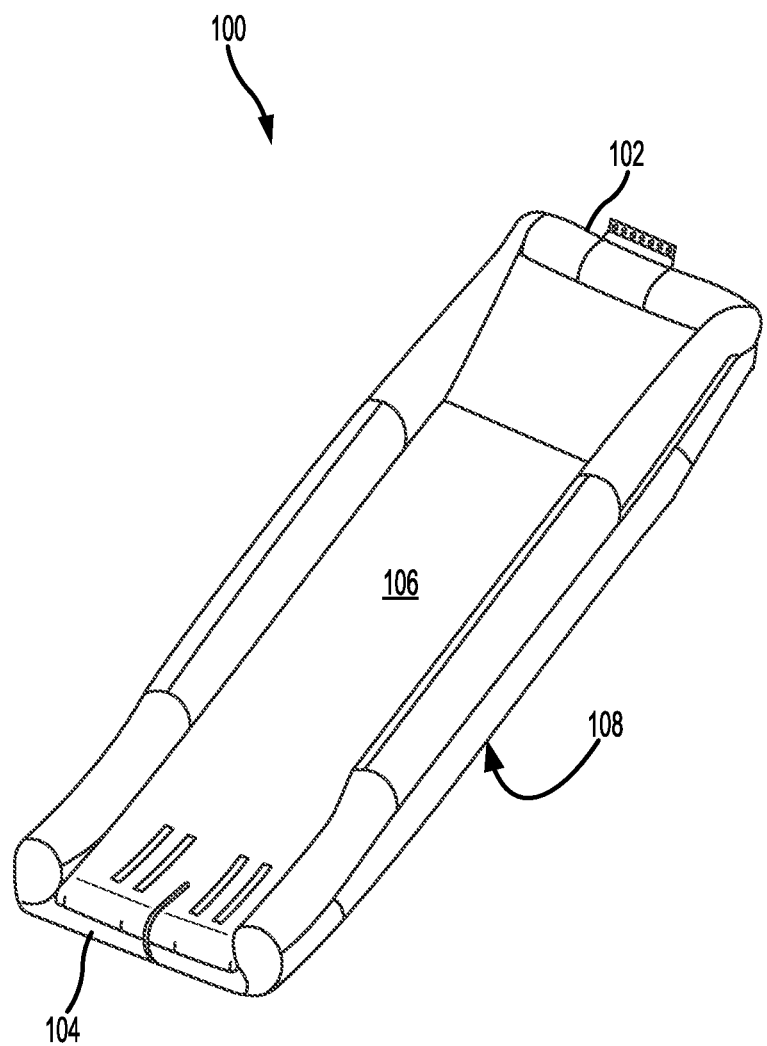
FIG. 1 illustrate an evacuation slide in a deployed position, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

Releasable restraints, as disclosed herein, may aid in controlling inflation and deployment of evacuation slides. In accordance with various embodiments, the releasable restraints may be configured to separate or de-couple in response to an increased internal slide pressure. After deployment, the separated pieces of the releasable restraint may be re-attached to one another such that the same releasable restraint can be used multiple times. In this regard, the releasable restraints, as described herein, are reusable. Reusable releasable restraints may provide cost saving, particularly, with regard to slide testing and certification, wherein multiple deployments of an evacuation slide are performed.

With reference to FIG. 1, an evacuation slide 100 is illustrated, in accordance with various embodiments. Evacuation slide 100 may deploy from an aircraft, such as from, for example, an aircraft fuselage or aircraft wing. Evacuation slide 100 may comprise a head end 102 and a toe end 104 opposite head end 102. Head end 102 may be coupled to an aircraft. Evacuation slide 100 may comprise a sliding surface 106 and an underside surface 108 that is opposite sliding surface 106. Toe end 104 of evacuation slide 100 may be configured to contact an exit surface in response to evacuation slide 100 being deployed. Evacuation slide 100 may be an inflatable slide. FIG. 1 illustrates evacuation slide 100 in an inflated or "deployed" position. Evacuation slide 100 may comprise a dual lane slide. However, evacuation slide 100 may comprise any number of lanes.

Figure 2A:
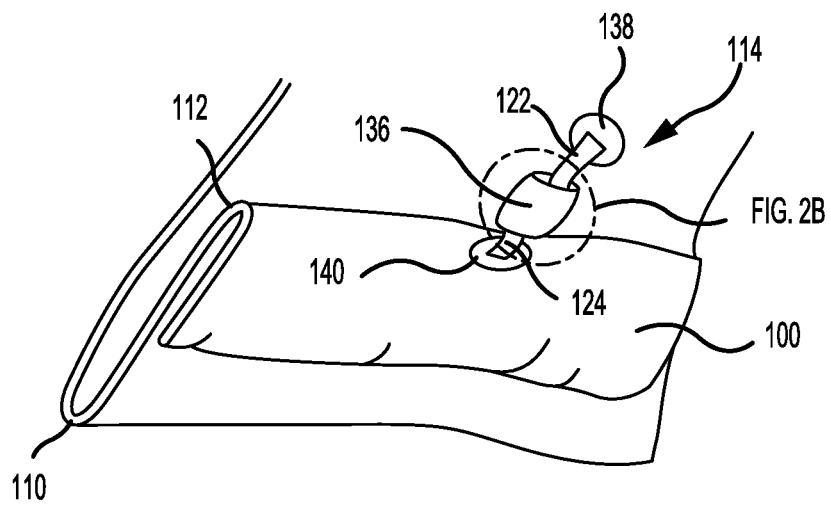
FIGS. 2A and 2B illustrate a releasable restraint retaining an evacuation slide in a folded, or "stowed," position, in accordance with various embodiments.
Figure 2B:
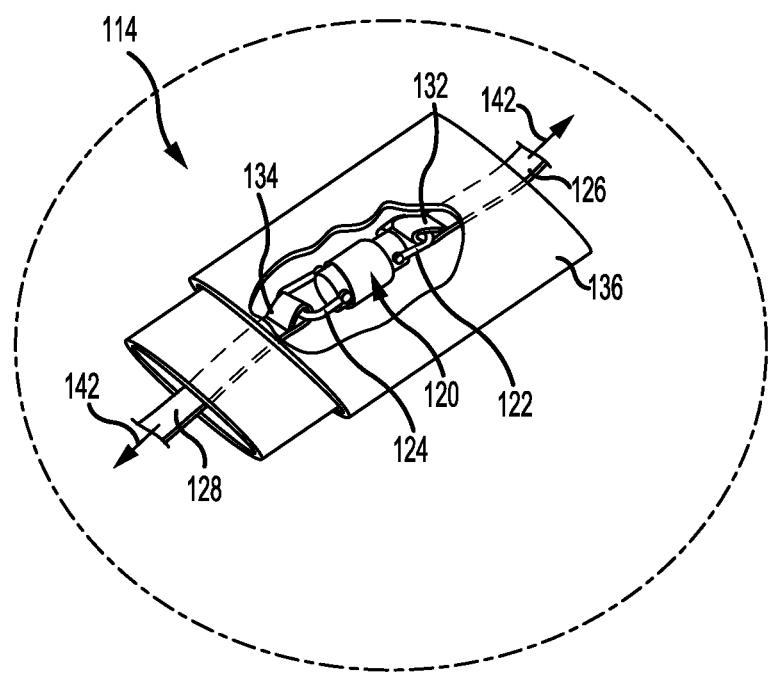

With reference to FIGS. 2A and 2B, evacuation slide 100 is illustrated in a stowed position. When evacuation slide 100 is in the stowed position, evacuation slide 100 may include one or more folds, such as first fold 110 and second fold 112. Evacuation slide 100 may include a deployment assembly 114. Deployment assembly 114 may aid in a staged deployment of evacuation slide 100. Deployment assembly 114 includes one or more releasable restraint(s) 120 (FIG. 2B). Releasable restraint 120 may aid in maintaining first fold 110 and/or second fold 112 and/or in the staged deployment of evacuation slide 100. In accordance with various embodiments, evacuation slide 100 may unfold (i.e., deploy) in response to separation of releasable restraint 120.

In various embodiments, releasable restraint 120 may be configured to separate in response to an internal pressure of evacuation slide 100 exceeding a threshold pressure. For example, a gas cylinder may supply a flow of pressurized fluid to evacuation slide 100 in response to evacuation slide 100 being deployed. Evacuation slide 100 may begin to inflate and an internal pressure of evacuation slide 100 may increase. Releasable restraint 120 may maintain evacuation slide 100 in the folded position until the internal pressure has increased to greater than a predetermined threshold pressure. Releasable restraint 120 may separate in response to the internal pressure of evacuation slide 100 being greater than the predetermined threshold pressure. Evacuation slide 100 may unfold in response to releasable restraint 120 separating.

In various embodiments, deployment assembly 114 may include a first shackle 122 and a second shackle 124. First shackle 122 may be coupled between releasable restraint 120 and a first strap 126. Second shackle 124 may be coupled between releasable restraint 120 and a second strap 128. First and second straps 126, 128 may comprise rope, tape, ribbon, webbing, or any other desired material. An end 132 of first strap 126 may form a loop through which first shackle 122 is located. An end 134 of second strap 128 may form a loop through which second shackle 124 is located. A cover 136 may surround releasable restraint 120. Cover 136 may comprise a fabric. For example, cover 136 may comprise nylon, ballistic nylon, polypropylene, polyester, cotton, or other desired material.

First and second straps 126, 128 may each be coupled to evacuation slide 100. First strap 126 may be coupled to a first portion 138 of evacuation slide 100. Second strap 128 may be coupled to a second portion 140 of evacuation slide 100. In various embodiments, second portion 140 is closer to toe end 104 (with momentary reference to FIG. 1) of evacuation slide 100 as compared to first portion 138. In various embodiments, first portion 138 may be located on sliding surface 106 (with momentary reference to FIG. 1) and second portion 140 may be located on underside surface 108 (with momentary reference to FIG. 1). During inflation of evacuation slide 100, the increasing internal pressure of evacuation slide 100 tends to cause first and second straps 126, 128 to translate away from one another, thereby causing a force 142 in opposing directions to be applied to releasable restraint 120. As described in further detail below, releasable restraint 120 is configured to decouple or separate in response to the force 142 applied by first and second straps 126, 128 exceeding a predetermine threshold force (i.e., in response to the internal pressure of evacuation slide 100 exceeding a predetermined threshold pressure).

Figure 3A:
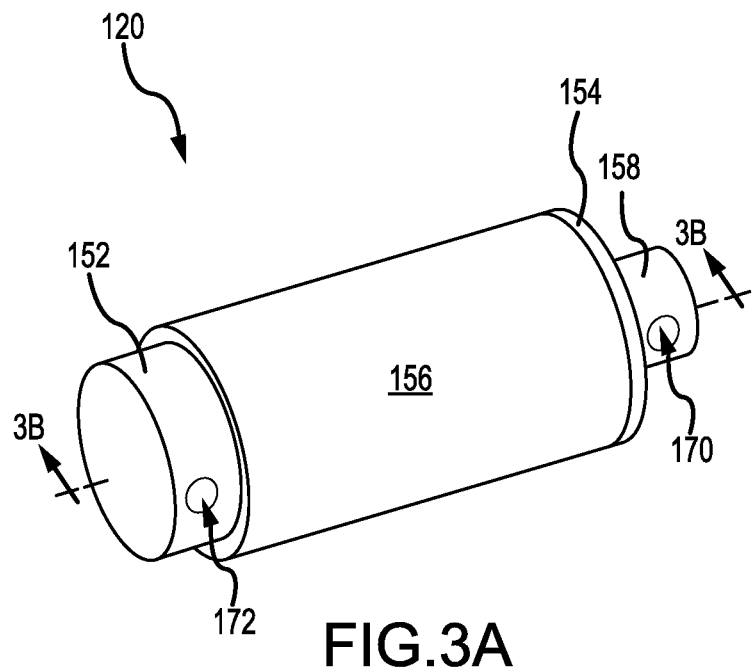
FIGS. 3A and 3B illustrate a perspective view and a cross-section view, respectively, of a releasable restraint in a secured position, in accordance with various embodiments.
Figure 3B:
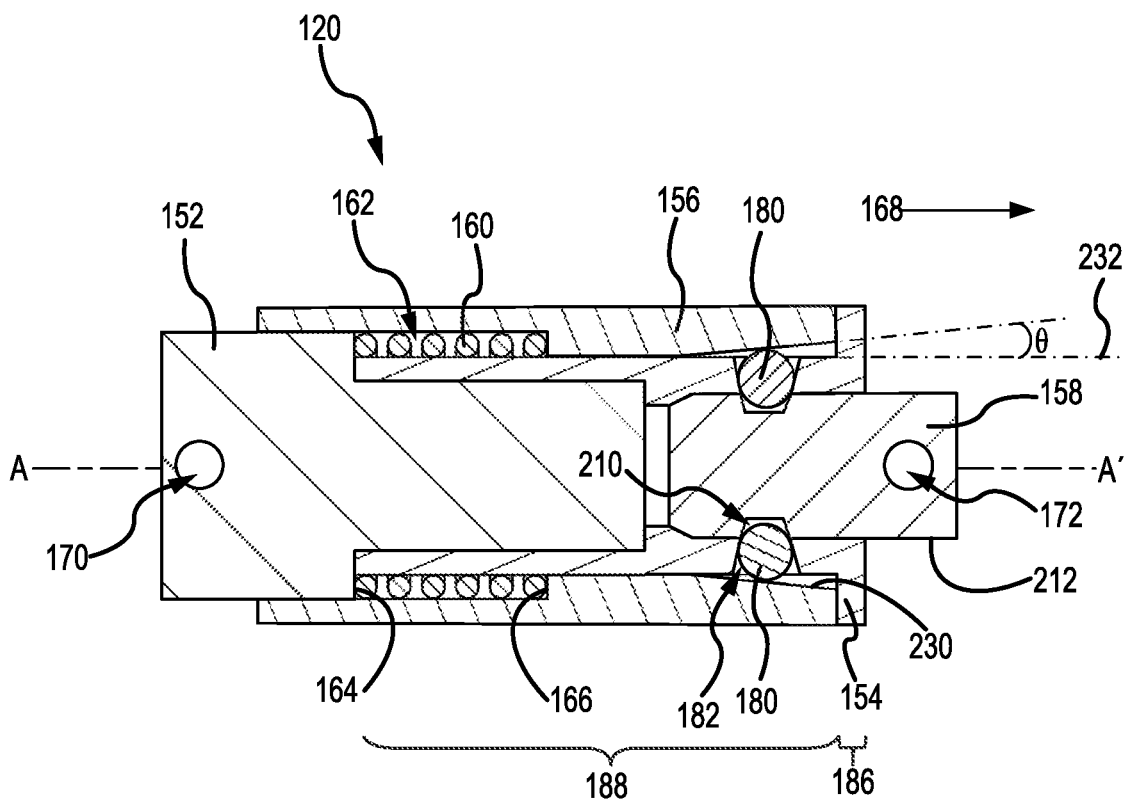

With reference to FIGS. 3A and 3B, a releasable restraint 120 is illustrated. FIG. 3A illustrates a perspective view of releasable restraint 120, and FIG. 3B illustrates a cross-section view of releasable restraint taken along the line 3B-3B in FIG. 3A. In accordance with various embodiments, releasable restraint 120 includes a base 152, a socket 154 coupled to the base 152, and a sleeve 156 located around the base 152 and the socket 154. Socket 154 may be coupled to base 152 via, for example, threaded engagement, a press fitting or friction coupling, or any other suitable attachment means. In accordance with various embodiments, releasable restraint 120 further includes a plug 158 releasably coupled to socket 154. Releasable restraint 120 further includes a spring 160 located in a spring cavity 162 defined by base 152, socket 154, and sleeve 156. Spring 160 applies a biasing force against sleeve 156. Spring 160 is configured to bias sleeve 156 away from base 152. Base 152 includes a spring surface 164. Sleeve 156 includes a spring surface 166. Spring 160 is located between spring surface 164 and spring surface 166, and may be in contact with spring surface 164 and/or spring surface 166. Spring 160 is configured to force spring surface 166 of sleeve 156 away from spring surface 164 of base 152 (i.e., in the direction of arrow 168).

In various embodiments, base 152 may define an opening 170. Plug 158 may define an opening 172. With momentary combined reference to FIGS. 3A and 2B, opening 170 may be configured to receive second shackle 124. Opening 172 may be configured to receive first shackle 122. Second shackle 124 may be located through opening 170. First shackle 122 may be located through opening 172. In this regard, first strap 126 may be coupled to plug 158 via first shackle 122, and second strap 128 may be coupled to base 152 via second shackle 124.

Referring to FIG. 3B, in accordance with various embodiments, releasable restraint 120 further includes a plurality of spherically-shaped balls, or beads, 180. Each ball 180 may be located in a ball opening 182 defined by socket 154.

Figure 4:
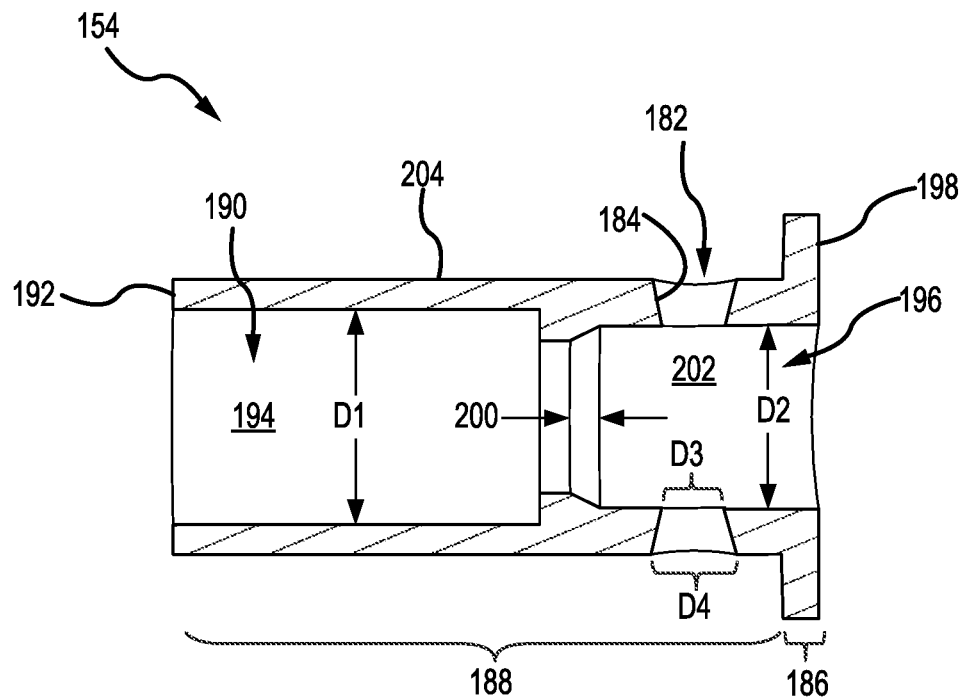
FIG. 4 illustrates a cross-section view of a socket of a releasable restraint, in accordance with various embodiments.

With reference to FIG. 4, a cross-section view of socket 154 is illustrated. In accordance with various embodiments, the walls 184 defining ball opening 182 may be slanted, such that a diameter of ball opening 182 increases in the radially outward direction. Ball opening 182 may have a generally conical or frustoconical shape. Socket 154 may include a head 186 and a shaft 188 extending from head 186. Ball openings 182 may be formed in shaft 188. Socket 154 defines a base channel 190. Shaft 188 may define base channel 190. Base channel 190 may be formed in a first axial end 192 of socket 154. Base channel 190 is configured to receive base 152, with momentary reference to FIG. 3B. Base channel 190 has a diameter D1. Diameter D1 may be selected such that base 152 may be press fit in socket 154, thereby forming a friction coupling between base 152 and socket 154. In various embodiments, the radially inward surface 194 that defines base channel 190 may be threaded and configured to engage a threaded surface of base 152. Socket 154 further defines a plug channel 196. Plug channel 196 may be defined by head 186 and the portion of shaft 188 proximate head 186. Plug channel 196 may be formed in a second axial end 198 of socket 154. Plug channel 196 is configured to receive plug 158, with momentary reference to FIG. 3B. In various embodiments, a diameter D2 of plug channel 196 may be less than diameter D1 of base channel 190. In various embodiments, diameter D2 decreases in an area 200 of plug channel 196. Area 200 of plug channel 196 may be distal head 186 and second axial end 198 (i.e., closer to base channel 190 as compared to second axial end 198). Area 200 may be configured to receive a slanted portion 201 (with momentary reference to FIG. 5) of plug 158. A radially inward surface 202 of socket 154 defines plug channel 196. In accordance with various embodiments, a diameter D3 of ball opening 182, as measured at radially inward surface 202, is less than a diameter D4 of ball opening 182, as measured at radially outward surface 204 of shaft 188.

Figure 5:
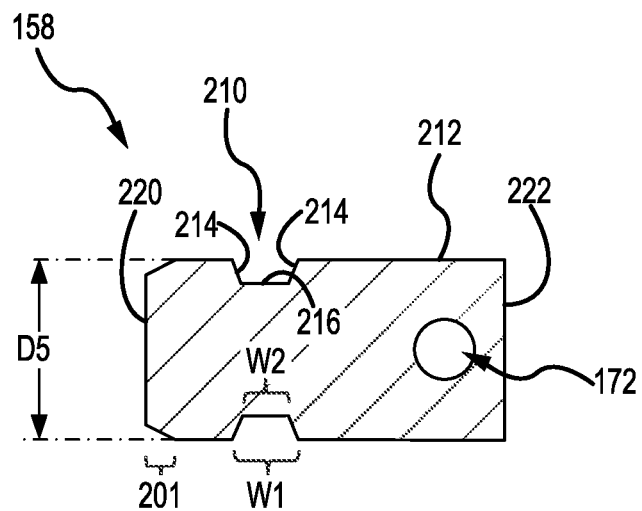
FIG. 5 illustrates a cross-section view of a plug of a releasable restraint, in accordance with various embodiments.

Returning to FIG. 3B, when releasable restraint 120 is in the attached or secured position, (i.e., when plug is coupled to socket 154 and base 152), balls 180 may be located in a ball groove 210 defined by plug 158. With reference to FIG. 5, a cross-section view of plug 158 is illustrated. In accordance with various embodiments, ball groove 210 may be formed in a radially outward surface 212 of plug 158. Ball groove 210 extends radially inward from radially outward surface 212. In various embodiments, the radially extending walls 214 that define ball groove 210 may be slanted. Walls 214 may extend from radially outward surface 212 to a floor 216 of ball groove 210. A width W1 of ball groove 210, as measured axially at radially outward surface 212, may be greater than a width W2 of ball groove 210, as measured axially at floor 216. In various embodiments, radially outward surface 212 may be slanted proximate a first axial end 220 of plug 158, such that a diameter D5 of plug 158, as measured at radially outward surface 212, decreases proximate first axial end 220. In the secured position, illustrated in FIG. 3B, first axial end 220 is located proximate (i.e., closer to) base 152, as compared to a second axial end 222 of plug 158.

Returning to FIG. 3B, in the secured position, sleeve 156 may be in contact with socket 154. Spring 160 may bias sleeve 156 toward, and into contact with, head 186 of socket 154. In various embodiments, an interference surface 230 of sleeve 156 may be configured to force balls 180 into ball groove 210, when sleeve 156 is in contact with head 186. In accordance with various embodiments, interference surface 230 is slanted, or angled, such that a diameter of sleeve 156, as measured at interference surface 230, increases in the direction of head 186 of socket 154 (i.e., the diameter of a portion of interference surface 230 proximate head 186 is greater than the diameter of a portion of interference surface 230 distal head 186). An angle theta (θ) of interference surface 230 may be selected such that interference surface 230 contacts balls 180, when a portion of each ball 180 is located in ball groove 210 (i.e., when a portion of each ball 180 is located radially inward of radially outward surface 212 of plug 158) and/or when sleeve 156 is contacting head 186 of socket 154. Angle theta (θ) may be measured relative to a horizontal plane 232. Horizontal plane 232 may be coplanar with radially outward surface 204 (FIG. 4) of shaft 188 of socket 154 and/or parallel to a center axis of A-A' of sleeve 156. As used herein, the terms "axial" and "axially" refer to directions parallel to center axis A-A', the terms "radial" and "radially" refer to directions toward and away from center axis A-A', and the terms "circumferential" and "circumferentially" refer to directions about center axis A-A'. In accordance with various embodiments, interference surface 230 is non-parallel to center axis A-A'. In the secured position, balls 180 are located in ball groove 210 and generate an interference with walls 214 (FIG. 5) of plug 158. The interference between balls 180 and walls 214 restricts axial translation of plug 158 relative to base 152 and socket 154, thereby coupling or securing plug 158 to base 152 and socket 154.

Figure 6:
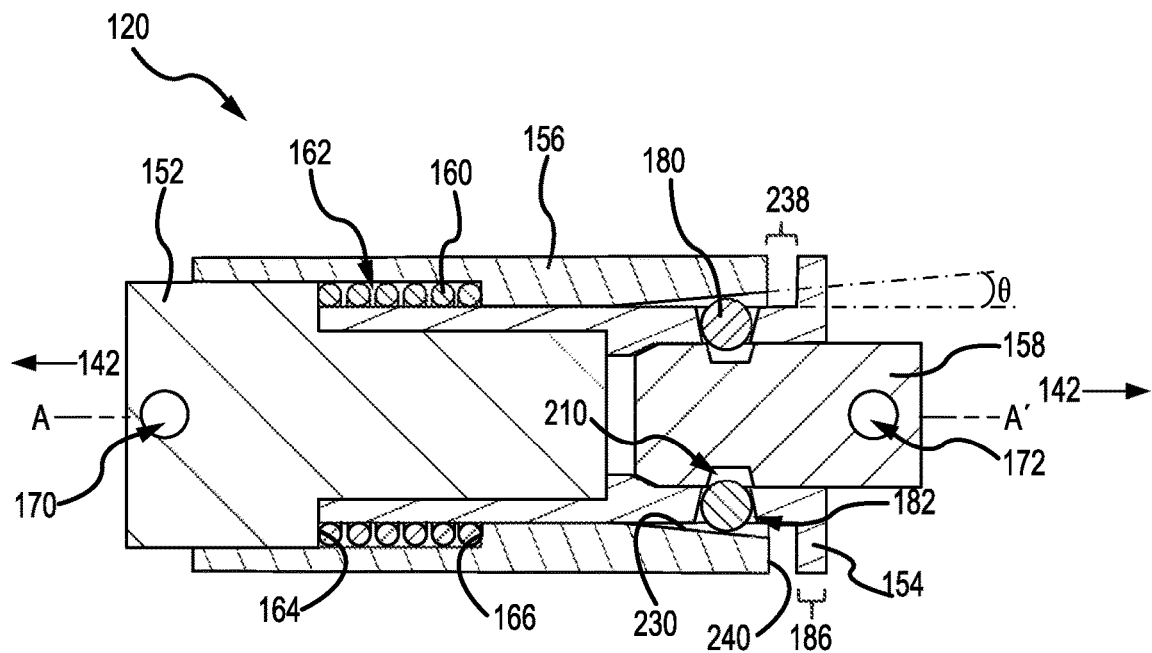
FIG. 6 illustrates a cross-section view of a releasable restraint during evacuation slide deployment, in accordance with various embodiments.

With reference to FIG. 6, a cross-section view of releasable restraint 120 is illustrated, during evacuation slide deployment. In response to deployment (i.e., inflation) of evacuation slide 100 (FIG. 1), first and second straps 126, 128 apply force 142, in opposing directions, to releasable restraint 120. The force 142 from first and second straps 126, 128 is applied to balls 180 via walls 214 (FIG. 5) of ball groove 210. The angle of walls 214 relative to floor 216 and the angle theta (θ) of interference surface 230 are configured to cause balls 180 to translate in the radially outward direction and thereby force sleeve 156 to translate away from head 186, in response to force 142 exceeding the biasing force applied by spring 160. Radially outward translation of balls 180 causes a distance 238 between an axial end 240 of sleeve 156 and head 186 of socket 154 to increase. Translation of sleeve 156 away from head 186 decreases the axial distance between spring surface 164 and spring surface 166, thereby causing spring 160 to compress.

Figure 7:
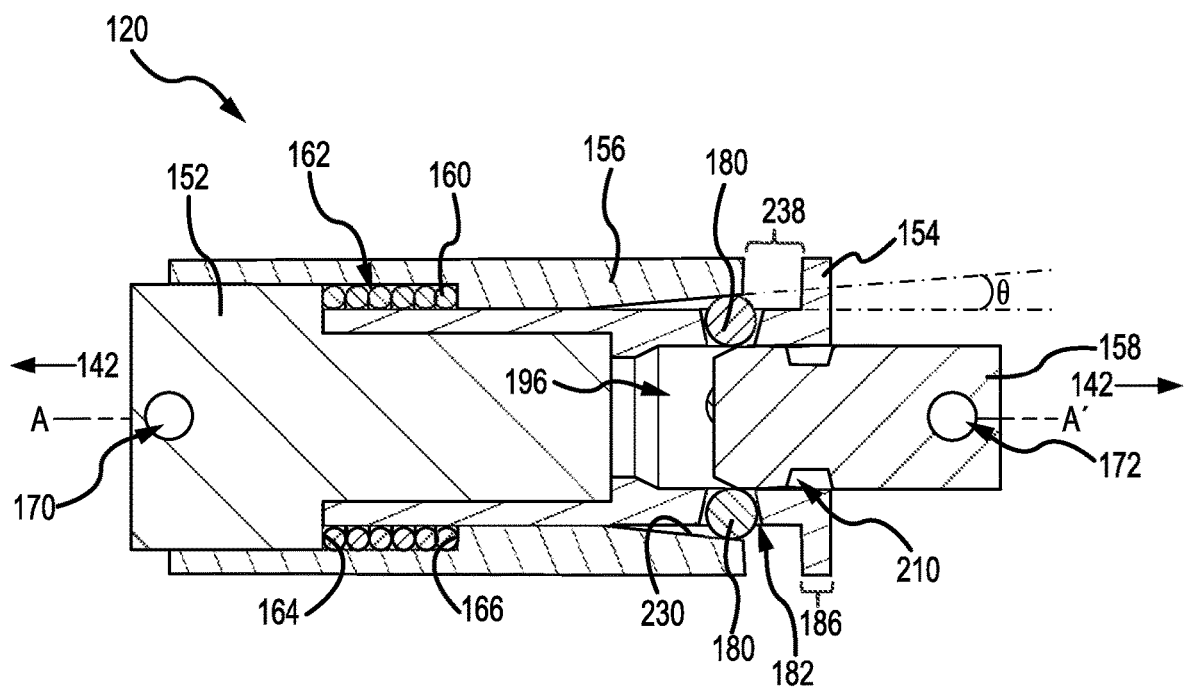
FIG. 7 illustrates a cross-section view of a releasable restraint during separation of the plug, in accordance with various embodiments.

With reference to FIG. 7, as the internal pressure within evacuation slide 100 continues to increase, the force 142 applied by first and second straps 126, 128 increases, thereby forcing balls 180 to translate out ball groove 210. The radially outward translation of balls 180 forces sleeve 156 away from head 186 of socket 154, thereby increasing distance 238. In response to the entirety of each ball 180 being located radially outward of ball groove 210 (i.e., radially outward of radially outward surface 212 of plug 158), plug 158 may translate out plug channel 196. Stated differently, releasable restraint 120 translates to the unsecured position, wherein plug 158 may decouple from base 152 and socket 154, in response to removal of the interference between balls 180 and plug 158 (i.e. between balls 180 and walls 214 of ball groove 210). In various embodiments, sleeve 156 is configured such that a portion of sleeve 156 remains in contact with, and/or radially outward of, balls 180, when releasable restraint 120 is in the unsecured position, to maintain balls 180 within ball openings 182.

The force 142 associated with translating balls 180 radially outward (i.e., the force associate with separating or decoupling releasable restraint 120) may be adjusted by increasing or decreasing the spring constant of spring 160 and/or by increasing or decreasing the angle theta (θ) of interference surface 230, and/or by increasing or decreasing the angle of walls 214 relative to floor 216. For example, increasing the angle theta (θ) of interference surface 230 may decrease the force associated with separating releasable restraint 120 (i.e., with decoupling plug 158 from socket 154).

Figure 8:
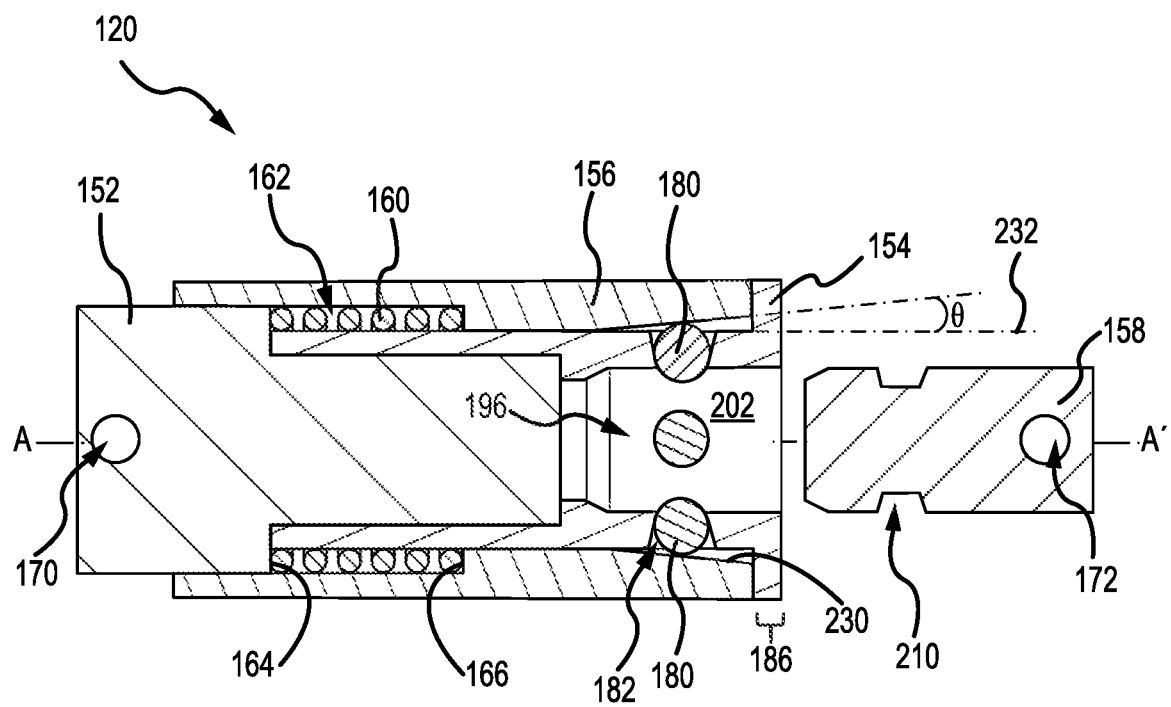
FIG. 8 illustrates a cross-section view of releasable restraint in a separated position, in accordance with various embodiments.

With reference to FIG. 8, a cross-section view of releasable restraint 120 with plug 158 separated from base 152 and socket 154 is illustrated. In response to removal of the interference between plug 158 and balls 180, spring 160 may force sleeve 156 toward head 186. Translation of sleeve 156 toward head 186 may force balls 180 radially inward, such that, at least, a portion of each ball 180 is located in plug channel 196. In various embodiments, spring 160 may force sleeve 156 into contact with head 186 of socket 154. In this regard, in response to removal of plug 158, releasable restraint 120 translates or "resets" to a position configured to engage plug 158, upon reinsertion of plug 158 into plug channel 196. In this regard, releasable restraint 120 translates to a position, wherein balls 180 are located radially inward of radially inward surface 202 of socket 154.

Figure 9:
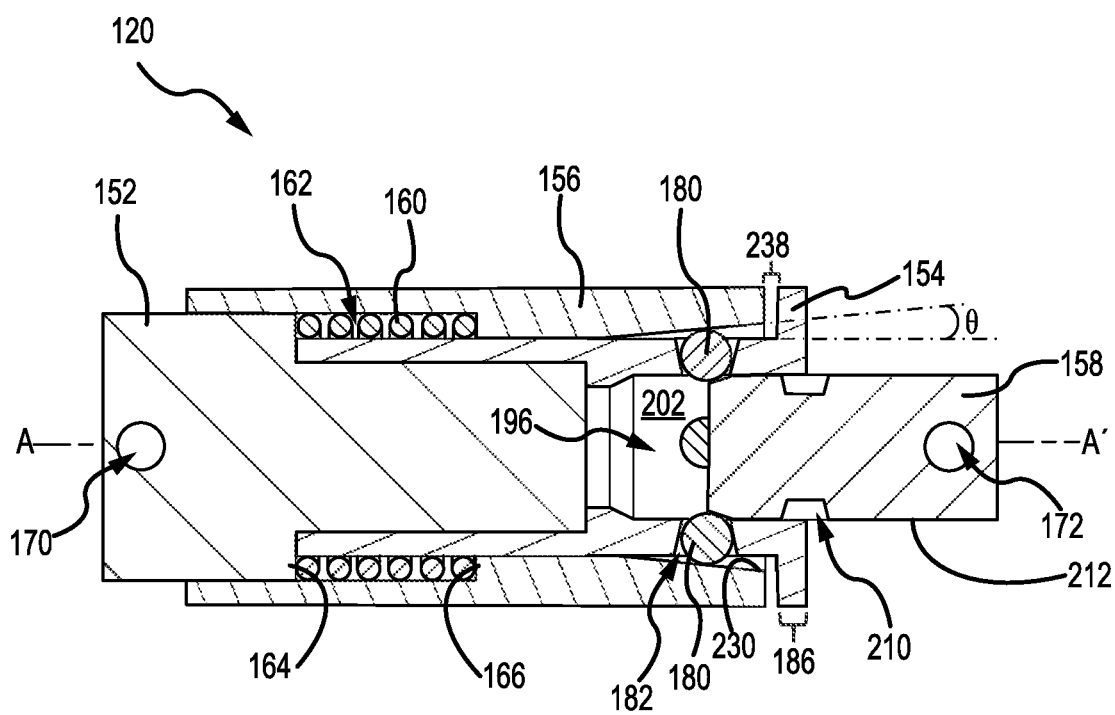
FIG. 9 illustrates a cross-section view of a releasable restraint during insertion of the plug of the releasable restraint, in accordance with various embodiments.

With reference to FIG. 9, securement of releasable restraint 120 is illustrated. In accordance with various embodiments, releasable restraint 120 may be translated to a secured position by inserting plug 158 into plug channel 196. Radially outward surface 212 of plug 158 is configured to contact balls 180 and force balls 180 radially outward. In accordance with various embodiments, radially outward surface 212 being slanted proximate first axial end 220 of plug 158, may facilitate the translation of balls 180 over plug 158 and toward interference surface 230. Translation of balls 180 radially outward, in combination with the angle theta (θ) of interference surface 230, may force sleeve 156 away from head 186 of socket 154, thereby increasing distance 238 and allowing balls 180 to continue translating radially outward. In response to balls 180 being radially aligned with ball groove 210, spring 160 may force sleeve 156 toward head 186. Translation of sleeve 156 toward head 186 may force balls 180 radially inward and into ball groove 210. Locating balls 180 in ball groove 210 generates an interference between balls 180 and walls 214, thereby coupling and/or securing plug 158 to base 152 and socket 154.

Releasable restraints 120 employing spring 160 and slanted interference surface 230 to regulate the force associated with separation of releasable restraint 120 may allow for increased consistency with regard to releasable restraint 120 separating at the desired pressures. In this regard, releasable restraints 120 may allow for increased control of the deployment of evacuation slide 100 in FIGS. 1 and 2A. Further, employing balls 180, which reset after separation of plug 158, allows releasable restraint 120 to be employed in subsequent evacuation slide deployments by reinserting plug 158 into plug channel 196 to re-secure releasable restraint 120. In this regard, releasable restraint 120 is reusable. Reusing releasable restraint 120 may provide cost savings, particularly, with regard to slide testing and certification, wherein multiple deployments of evacuation slide 100 may be performed.

Figure 10A:
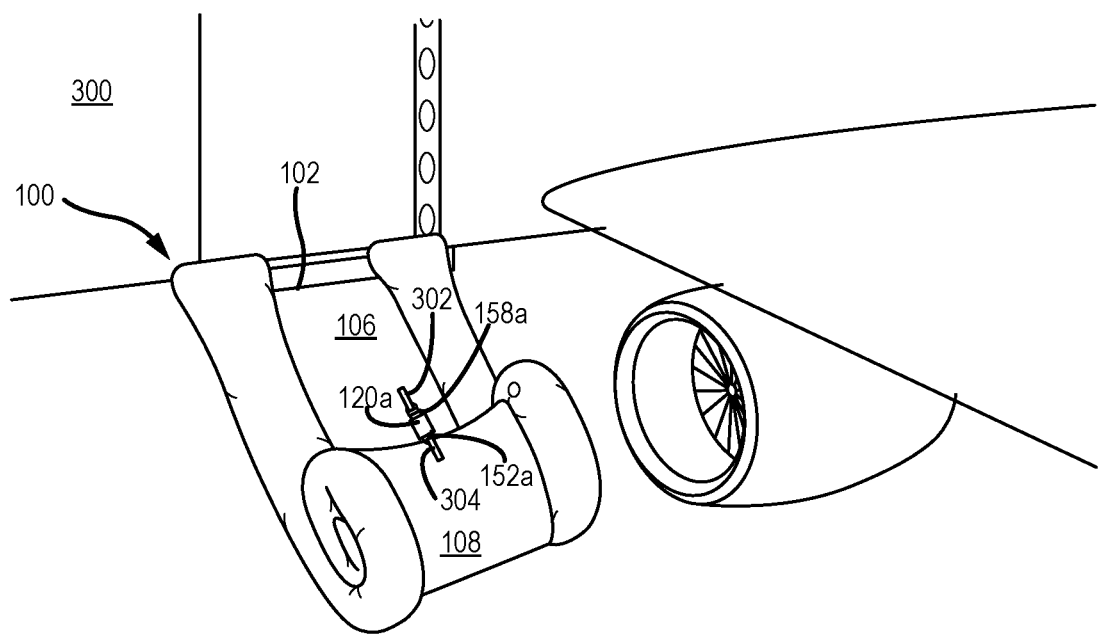
FIGS. 10A, 10B, and 10C illustrate staged deployment of an evacuation slide, in accordance with various embodiments.
Figure 10B:
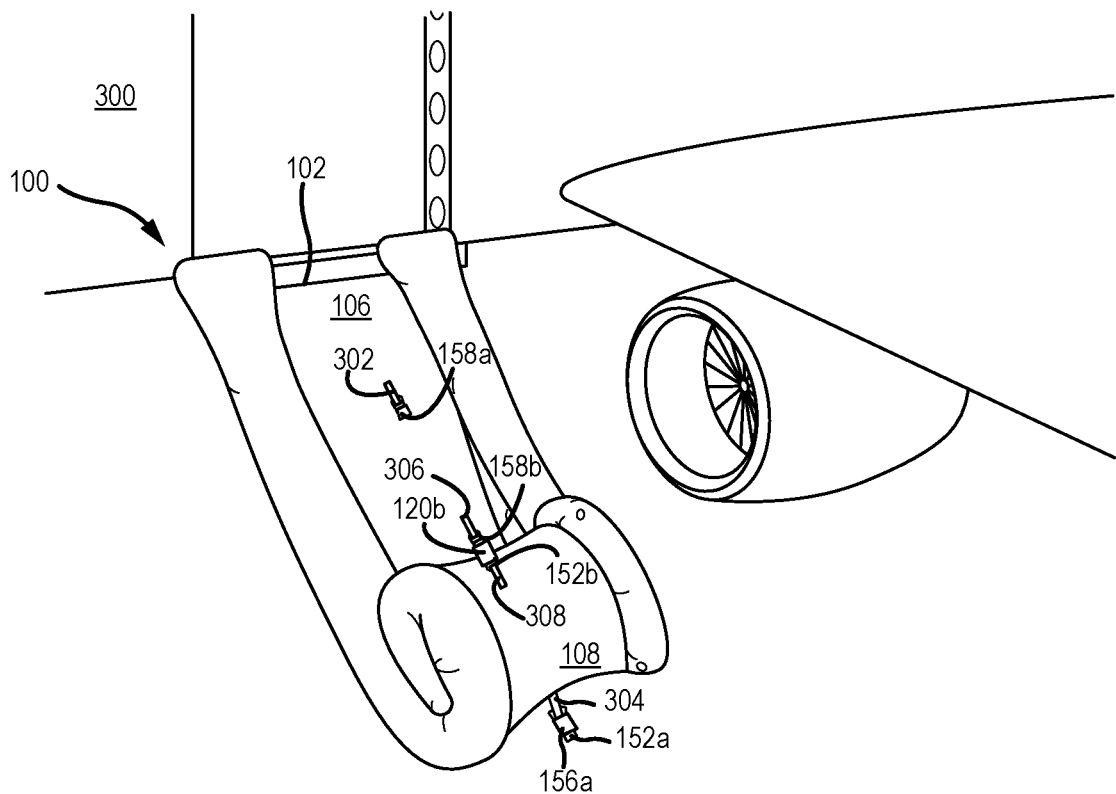
Figure 10C:
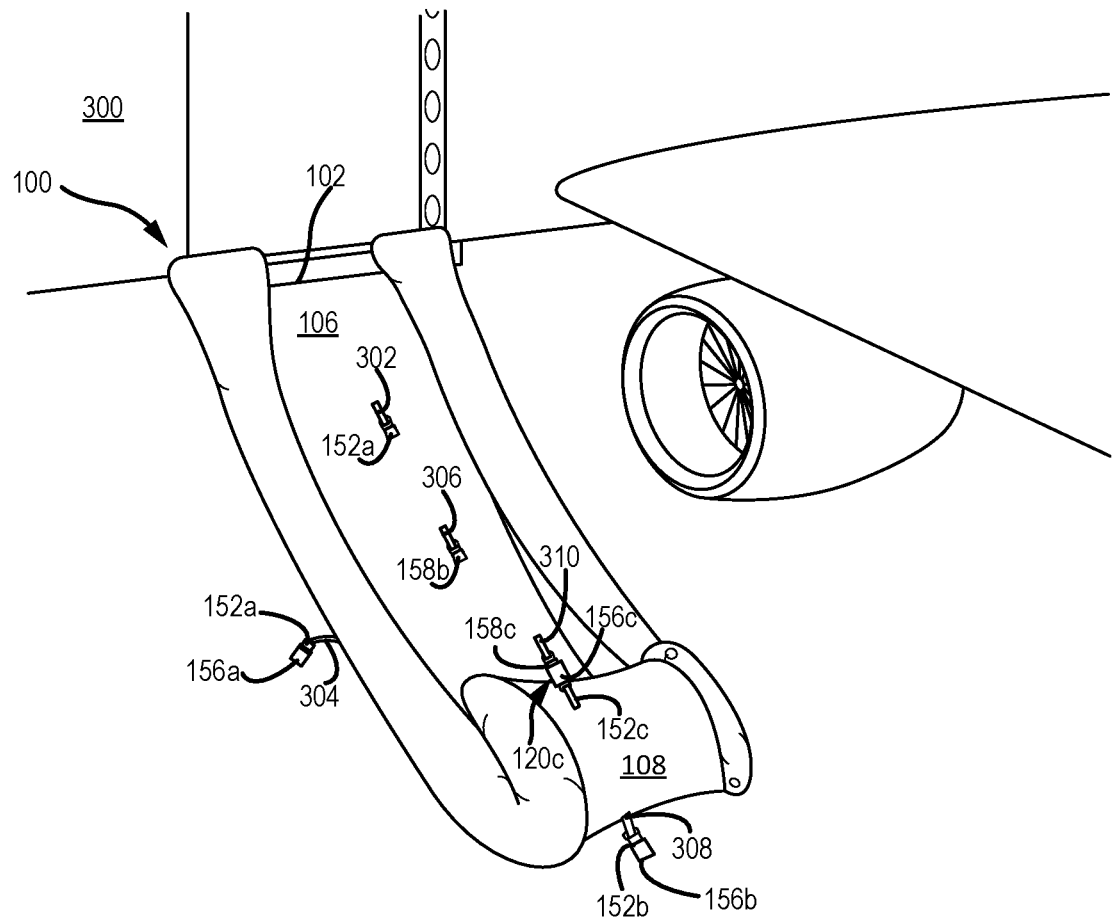

With reference to FIGS. 10A, 10B, and 10C, a staged deployment of evacuation slide 100 from an aircraft 300 is illustrated. With reference to FIG. 10A, a first stage of a deployment of evacuation slide 100 is illustrated, in accordance with various embodiments. A first (or initial) releasable restraint 120a may be coupled between a first strap 302 and a second strap 304. First strap 302 may be attached to a first plug 158a of first releasable restraint 120a. Second strap 304 may be coupled to a first base 152a of first releasable restraint 120a. In various embodiments, first strap 302 may be attached to sliding surface 106 and second strap 304 may be attached to underside surface 108. First releasable restraint 120a is configured to separate in response to an internal pressure of slide 100 exceeding a first threshold pressure.

With to reference to FIG. 10B, a second stage of deployment of evacuation slide 100 is illustrated, in accordance with various embodiments. In response to the internal pressure of slide 100 exceeding the first threshold pressure, first plug 158a separates from first base 152a and first sleeve 156a, thereby allowing evacuation slide 100 to unfold. A second releasable restraint 120b may be coupled between a third strap 306 and a fourth strap 308. Third strap 306 may be attached to a second plug 158b of second releasable restraint 120b. Fourth strap 308 may be coupled to a second base 152b of second releasable restraint 120b. In various embodiments, third strap 306 may be attached to sliding surface 106 and fourth strap 308 may be attached to underside surface 108. First strap 302 may be located closer to head end 102 as compared to third strap 306. Second releasable restraint 120b may be configured to separate in response to an internal pressure of slide 100 exceeding a second threshold pressure.

With to reference to FIG. 10C, a third stage of deployment of evacuation slide 100 is illustrated, in accordance with various embodiments. In response to the internal pressure of slide 100 exceeding the second threshold pressure, second plug 158b separates from second base 152b and second sleeve 156b, thereby allowing evacuation slide 100 to further unfold. The second threshold pressure may be greater than the first threshold pressure. In various embodiments, a spring of second releasable restraint 120b is configured to bias second sleeve 156b and may have a spring constant that is greater than the spring of first releasable restraint 120a. In various embodiments, an angle theta (θ) of the interference surface of first sleeve 156a may be greater than an angle theta (θ) of an interference surface of second sleeve 156b.

A third releasable restraint 120c may be coupled between a fifth strap 310 and a sixth strap 312. Fifth strap 310 may be attached to a third plug 158c of third releasable restraint 120c. Sixth strap 312 may be coupled to a third base 152c of third releasable restraint 120c. In various embodiments, fifth strap 310 may be attached to sliding surface 106 and sixth strap 312 may be attached to underside surface 108. First strap 302 and/or third strap 306 may be located closer to head end 102 as compared to fifth strap 310.

Third releasable restraint 120c may be configured to separate in response to an internal pressure of slide 100 exceeding a third threshold pressure. The third threshold pressure may be greater than the second threshold pressure. In various embodiments, a spring of third releasable restraint 120c is configured to bias third sleeve 156c and may have a spring constant that is greater than the spring of second releasable restraint 120b. In various embodiments, an angle theta (θ) of the interference surface of second sleeve 156b may be greater than an angle theta (θ) of an interference surface of third sleeve 156c.

Releasable restraints 120a, 120b, 120c employing springs and slanted interference surfaces to regulate the force associated with separation of releasable restraint may allow for increased consistency with regard to the releasable restraint separating at the desired pressures. In this regard, in addition to being reusable, releasable restraints 120a, 120b, 120c may allow for increased control of the deployment of evacuation slide 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
   a first strap coupled to a first portion of the evacuation slide;
   a second strap coupled to a second portion of the evacuation slide; and
   a first releasable restraint coupled between the first strap and the second strap, the first releasable restraint comprising:
      a first base coupled to the second strap;
      a first socket coupled to the first base, the first socket including a first head and a first shaft extending from the first head, wherein the first base is located in a base channel defined by the first shaft;
      a first sleeve configured to translate relative to the first shaft;
      a plurality of first balls located in the first shaft;
      a first plug coupled to the first strap and configured to be received by a first plug channel defined by the first socket; and
      a first spring located around the first shaft and configured to bias the first sleeve toward the first head of the first socket, wherein the first spring is in a spring cavity defined by the base, the socket, and the sleeve;
      the first base has a first spring surface, the first sleeve has a second spring surface, and the first spring extends between and to the first spring surface and the second spring surface.

2. The evacuation slide of claim 1, wherein the first sleeve includes a first interference surface radially outward of the plurality of first balls, and wherein the first interference surface is oriented at a first angle relative to a first center axis of the first sleeve.

3. The evacuation slide of claim 2, further comprising:
   a third strap coupled to a third portion of the evacuation slide;
   a fourth strap coupled to a fourth portion of the evacuation slide; and
   a second releasable restraint coupled between the third strap and the fourth strap, the second releasable restraint comprising:
      a second base coupled to the fourth strap;
      a second socket coupled to the second base, the second socket including a second head and a second shaft extending from the second head;
      a second sleeve configured to translate relative to the second shaft;
      a plurality of second balls located in the second shaft; and
      a second plug coupled to the third strap and configured to be received by a second plug channel defined by the second socket.

4. The evacuation slide of claim 3, wherein the first strap is coupled closer to a head end of the evacuation slide as compared to the third strap.

5. The evacuation slide of claim 4, wherein the second sleeve includes a second interference surface radially outward of the plurality of second balls, and wherein the second interference surface is oriented at a second angle relative to a second center axis of the second sleeve, the second angle being different from the first angle.

6. The evacuation slide of claim 4, wherein the second releasable restraint further comprises a second spring configured to bias the second sleeve toward the second head of the second socket, and wherein a first spring constant of the first spring is different from a second spring constant of the second spring.

7. The evacuation slide of claim 2, wherein a radially outward surface of the first plug defines a first ball groove.

8. The evacuation slide of claim 7, wherein a diameter of the first plug, as measured at the radially outward surface, decreases proximate an axial end of the first plug.

* * * * *